United States Patent
Chang

(10) Patent No.: US 11,039,302 B2
(45) Date of Patent: Jun. 15, 2021

(54) BASE STATION, USER EQUIPMENT, AND ASSOCIATED METHOD

(71) Applicants: SHARP KABUSHIKI KAISHA, Sakai (JP); FG Innovation Company Limited, Tuen Mun (HK)

(72) Inventor: Ningjuan Chang, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/090,212

(22) PCT Filed: Feb. 10, 2017

(86) PCT No.: PCT/CN2017/073229
§ 371 (c)(1),
(2) Date: Sep. 29, 2018

(87) PCT Pub. No.: WO2017/166929
PCT Pub. Date: Oct. 5, 2017

(65) Prior Publication Data
US 2019/0116490 A1    Apr. 18, 2019

(30) Foreign Application Priority Data

Apr. 1, 2016 (CN) .......................... 201610203546.6

(51) Int. Cl.
*H04W 8/22* (2009.01)
*H04W 76/27* (2018.01)
(Continued)

(52) U.S. Cl.
CPC ......... *H04W 8/22* (2013.01); *H04W 72/1268* (2013.01); *H04W 72/14* (2013.01);
(Continued)

(58) Field of Classification Search
CPC ............... H04W 8/22; H04W 72/1268; H04W 72/1284; H04W 88/023
See application file for complete search history.

(56) References Cited

U.S. PATENT DOCUMENTS

2013/0051288 A1* 2/2013 Yamada ................. H04L 5/001
370/280
2014/0241149 A1 8/2014 Liu et al.
(Continued)

FOREIGN PATENT DOCUMENTS

CN 101202578 A 6/2008
CN 104488312 A 4/2015
(Continued)

OTHER PUBLICATIONS

Samsung et al., "Skipping uplink transmission when no data to transmit," R2-157033, 3GPP TSG-RAN WG2 Meeting #92 Anaheim, U.S., Nov. 16-19, 2015. (Year: 2015).*
(Continued)

*Primary Examiner* — Jamal Javaid
*Assistant Examiner* — Ryan C Kavleski
(74) *Attorney, Agent, or Firm* — ScienBiziP, P.C.

(57) ABSTRACT

The invention provides a base station, user equipment (UE), and a method associated with transmitting or receiving UE capability information. The method used in the UE comprises: transmitting UE capability information comprising an indication indicating a specific scheduling mechanism supported by the UE; and receiving a configuration message comprising configuration information associated with the specific scheduling mechanism.

4 Claims, 6 Drawing Sheets

(51) Int. Cl.
  *H04W 72/12* (2009.01)
  *H04W 72/14* (2009.01)
  *H04W 88/02* (2009.01)
  *H04W 8/24* (2009.01)
  *H04W 80/02* (2009.01)

(52) U.S. Cl.
  CPC ......... *H04W 76/27* (2018.02); *H04W 88/023* (2013.01); *H04W 8/24* (2013.01); *H04W 72/1284* (2013.01); *H04W 80/02* (2013.01)

(56) References Cited

U.S. PATENT DOCUMENTS

| | | | | |
|---|---|---|---|---|
| 2014/0369242 | A1* | 12/2014 | Ng | H04W 72/0453 370/280 |
| 2015/0163727 | A1 | 6/2015 | Aoyagi et al. | |
| 2018/0192427 | A1 | 7/2018 | Wang et al. | |
| 2018/0242389 | A1* | 8/2018 | Phuyal | H04L 1/1812 |
| 2018/0310201 | A1* | 10/2018 | Lee | H04L 1/1819 |
| 2019/0045507 | A1* | 2/2019 | Sorrentino | H04W 4/40 |

FOREIGN PATENT DOCUMENTS

| | | |
|---|---|---|
| CN | 105142220 A | 12/2015 |
| WO | 2015/047145 A1 | 4/2015 |

OTHER PUBLICATIONS

CATT, "PDCCH missing issue in skipping UL transmission," R2-154121, 3GPP TSG RAN WG2 Meeting #91 bis Malmo, Sweden, Oct. 5-9, 2015. (Year: 2015).*

Samsung et al., "Skipping uplink transmission when no data to transmit", R2-157033, 3GPP TSG-RAN WG2 Meeting #92 Anaheim, U.S, Nov. 16-19, 2015.

CATT, "PDCCH missing issue in skipping UL transmission", R2-154121, 3GPP TSG RAN WG2 Meeting #91bis Malmö, Sweden, Oct. 5-9, 2015.

* cited by examiner

BASE STATION, USER EQUIPMENT, AND ASSOCIATED METHOD

TECHNICAL FIELD

The present invention relates to the technical field of wireless communication. More specifically, the present invention relates to a base station, User Equipment (UE), and an associated method for transmitting/receiving UE capability information.

BACKGROUND

In the current wireless network services and the development thereof, because of the diversity of the services, the requirements for network transmission performance are becoming increasingly high. VoLTE, video teleconferencing, and other real-time applications have higher requirements for time-delay of data transmission. In addition to the requirements for higher transmission rates, many future applications are bound to be stricter in terms of the requirements for time-delay of service transmission. For example, virtual reality or vehicle communication must meet the requirement of short time-delay. The 3rd generation Partnership Project (3GPP) is working on developing a new mechanism to reduce the data transmission time-delay. The research of this topic starts from all aspects of data transmission in the access network. Researchers aim to implement a processing and transmission mechanism with a shorter time-delay, including introducing a shorter Transmission Time Interval (TTI) at a physical layer, introducing a faster uplink scheduling mechanism at Layer 2 that is above the physical layer, and enhancing a method for Timing advance (TA) acquisition for user equipment (UE) in a handover procedure.

As described above, the research on the technology of reducing the time-delay of Layer 2 is mainly focusing on the enhancement of a scheduling mechanism. Faster scheduling can allow a user to obtain more quickly the resources for data transmission after the data arrives, which is mainly achieved through pre-scheduling. Current studies on the faster scheduling mechanism include introducing a Semi-Persistent Scheduling (SPS) mechanism with a interval of only one TTI and a contention-based uplink data channel mechanism for users to obtain resources through contention. A faster scheduling mechanism might require the UE to constantly transmit uplink data packets on pre-allocated resources. Even if the UE currently does not have service data to transmit, the UE is also required to transmit empty data packets to fill in the allocated resources, which not only leads to UE energy consumption but also causes an uplink interference problem. A possible solution to this problem is that the base station (evolved Node, eNB) may prevent the UE from transmitting empty packets via signaling. In addition, in a faster scheduling mechanism, the eNB may allocate resources to UE in advance or release the resources at a suitable moment when it is determined that the UE has no data. The allocation and release of the configured resources by the eNB and the UE need to be consistent in time; otherwise, delay of data transmission and resource waste may easily occur. For example, when the eNB transmits the resource allocation signaling to the UE but is not received by the UE successfully, the UE will obtain the resource through the traditional resource request when the data arrives on the UE, which delays the transmission of the data. The possible solution to this problem is that the UE transmits feedback information to the eNB after receiving the eNB's resource allocation signaling or a resource release command.

With regard to the above-mentioned mechanisms, the problem is that the above-mentioned mechanisms may be mechanisms that are optional. Because vendors of terminals have different expectations on the effects of these optimization mechanisms, not all vendors want to implement these mechanisms within their UE products. When different UEs access the network, it may be desirable for the eNB to configure the UE with a faster scheduling mechanism to improve network transmission performance. Configuration errors will occur when UE does not support this function, thereby causing Radio Resource Control (RRC) connection failures at the UE.

SUMMARY OF INVENTION

As described in the background section, if not all UEs are equipped with a faster scheduling mechanism, eNB configuration of these mechanisms will cause configuration errors at the UE. No effective way exists in the existing mechanism to address the problem. The present invention focuses on this aspect and aims to solve the problem.

The methods described in the present invention are not limited to an LTE system of Release 14 as described in the background section, but may also be applied to other systems or scenarios.

According to a first aspect of an embodiment of the present invention, a method for user equipment (UE) is provided, comprising transmitting UE capability information comprising an indication indicating a specific scheduling mechanism supported by the UE; and receiving a configuration message comprising configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with a interval of 1 ms or of a transmission time interval (TTI).

In one embodiment, the specific scheduling mechanism comprises a transmission disable mechanism for Media Access Control (MAC).

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a response information mechanism for a pre-scheduling resource allocation and/or pre-scheduling resource release.

In one embodiment, the response information mechanism for pre-scheduling resource allocation and/or pre-scheduling resource release comprises: replying with response information at a next available uplink moment when the UE receives the pre-scheduling resource allocation and/or pre-scheduling resource release signaling, the response information being used to indicate that the UE has successfully received and/or applied the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the method further comprises receiving a request regarding UE capability information, wherein the UE capability information is transmitted in response to the request.

In one embodiment, the UE capability information is included in a radio resource control (RRC) message.

In one embodiment, the RRC message is a UE capability information message.

According to a second aspect of the present invention, a user equipment (UE) is provided, comprising: a transmitting unit, configured to transmit a configuration message, wherein the configuration message comprises configuration information associated with the specific scheduling mechanism; and a receiving unit, configured to receive a configuration message, wherein the configuration message comprises configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with a interval of 1 ms or of a transmission time interval (TTI).

In one embodiment, the specific scheduling mechanism comprises a transmission disable mechanism for Media Access Control (MAC).

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a pre-scheduling resource allocation and/or released response information mechanism.

In one embodiment, the pre-scheduling resource allocation and/or released response information mechanism comprises: returning response information at a next available uplink moment when the UE receives the pre-scheduling resource allocation and/or pre-scheduling resource release signaling, the response information being used to indicate that the UE has successfully received and/or used the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the receiving unit is further configured to receive a request regarding UE capability information, wherein the UE capability information is transmitted in response to the request.

In one embodiment, the UE capability information is included in a radio resource control (RRC) message.

In one embodiment, the RRC message is a UE capability information message.

According to a third aspect of the present invention, a method in a base station is provided, comprising: receiving UE capability information, wherein the UE capability information comprises an indication indicating a specific scheduling mechanism supported by the UE; and transmitting a configuration message comprising configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with a interval of 1 ms or of a transmission time interval (TTI).

In one embodiment, the specific scheduling mechanism comprises a transmission disable mechanism for Media Access Control (MAC).

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a response information mechanism for pre-scheduling resource allocation and/or release.

In one embodiment, the response information mechanism for pre-scheduling resource allocation and/or release comprises: replying with response information at a next available uplink moment when the UE receives the pre-scheduling resource allocation and/or pre-scheduling resource release signaling, the response information being used to indicate that the UE has successfully received and/or applied the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the method further comprises: transmitting a request regarding UE capability information.

In one embodiment, the UE capability information is included in a radio resource control (RRC) message.

In one embodiment, the RRC message is a UE capability information message.

According to a fourth aspect of the present invention, a base station is provided, comprising: a receiving unit, configured to receive UE capability information, wherein the UE capability information comprises an indication indicating a specific scheduling mechanism supported by the UE; and a transmitting unit, configured to transmit a configuration message comprising configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with a interval of 1 ms or of a transmission time interval (TTI).

In one embodiment, the specific scheduling mechanism comprises a transmission disable mechanism for Media Access Control (MAC).

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a response information mechanism for pre-scheduling resource allocation and/or release.

In one embodiment, the response information mechanism for pre-scheduling resource allocation and/or release comprises: reply with response information at a next available uplink moment when the UE receives the pre-scheduling resource allocation and/or pre-scheduling resource release signaling, the response information being used to indicate that the UE has successfully received and/or applied the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the transmitting unit is further configured to transmit a request regarding the UE capability information.

In one embodiment, the UE capability information is included in a radio resource control (RRC) message.

In one embodiment, the RRC message is a UE capability information message.

With reference to the description and accompanying drawings hereinafter, the specific embodiments of the present invention are described in detail; and the manners in which the principle of the present invention is employed are illustrated. It should be understood that the embodiments of the present invention are not limited in scope. Within the spirit and scope defined by the appended claims, the embodiments of the present invention may include various variations, modifications, and equivalents.

The features described and/or illustrated with respect to a specific embodiment may be used in one or more other embodiments in the same or similar manner, or may be combined with the features in other embodiments, or may be used to replace the features in other embodiments.

It should be particularly noted that the term "comprise/include" used herein in this text refer to the existence of the features, whole pieces, steps or components, but do not exclude the existence or addition of one or more of other features, whole pieces, steps, or components.

BRIEF DESCRIPTION OF DRAWINGS

More aspects of the present invention may be better understood with reference to the accompanying drawings hereinafter. The components in the accompanying drawings are not drawn according to the practical ratio, and are only intended to show the principle of the present invention. For ease of illustration and description of some parts of the present invention, corresponding parts in the accompanying drawings may be scaled up or scaled down.

The elements and features in one accompanying drawing or embodiment may be combined with the elements and features in one or more other accompanying drawings or embodiments. In addition, in the accompanying drawings, similar reference numerals denote corresponding components in the accompanying drawings, and may be used to indicate corresponding components used in more than one embodiment.

DETAILED DESCRIPTION OF EMBODIMENTS

With reference to the accompanying drawings, the above described and other features of the present invention would be more pronounced through the description hereinafter. In the description and accompanying drawings, specific embodiments of the present invention are disclosed, and some embodiments that may be implemented based on the principle of the present invention are illustrated. It should be understood that the present invention is not limited to the described embodiments. On the contrary, the present invention includes all of the modifications, variations and equivalents falling within the scope defined by the appended claims. In addition, for simplicity, detailed description of the known art not directly related to the present invention is omitted to prevent confusion with respect to the understanding of the present invention.

With reference to the accompanying drawings and specific embodiments, a UE capability information transmission method according to the present invention is further described hereinafter.

In the following description, an LTE mobile communication system and its subsequent evolved releases are used as exemplary application environments to set forth embodiments of the present invention in detail. However, it is to be noted that the present disclosure is not limited to the following embodiments, but may be applied to other wireless communication systems, such as a future 5G cellular communication system.

Figure 1:
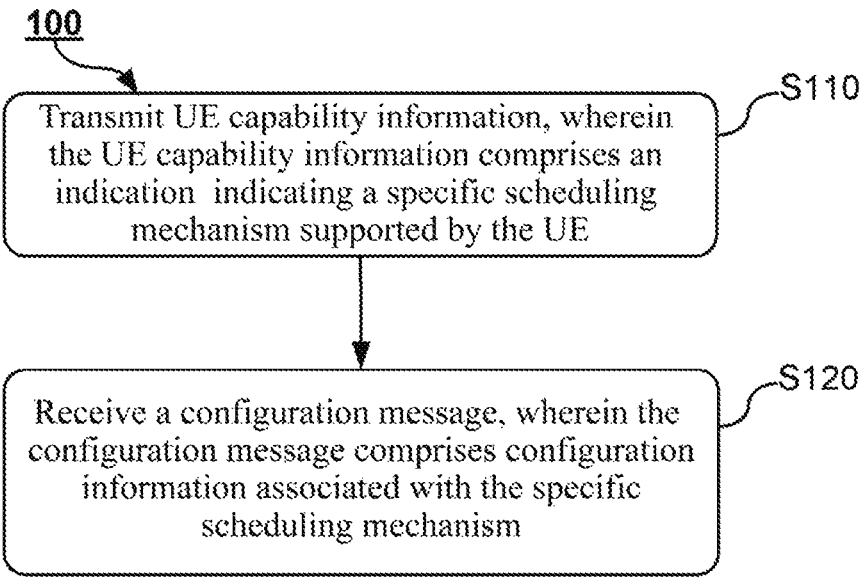
FIG. 1 is a flowchart of a method in a UE according to the present invention.

FIG. 1 is a flowchart of a method 100 in a UE according to the present invention. The method 100 includes the following steps.

Step S110: Transmit UE capability information, wherein the UE capability information comprises an indication indicating a specific scheduling mechanism supported by the UE.

Step S120: Receive a configuration message, wherein the configuration message comprises configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with an interval of 1 ms or of a transmission time interval (TTI).

In one embodiment, the specific scheduling mechanism comprises a transmission disable mechanism for Media Access Control (MAC).

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a response information mechanism for pre-scheduling resource allocation and/or release.

In one embodiment, the response information mechanism for pre-scheduling resource allocation and/or released comprises: replying with response information at a next available uplink moment when the UE receives the pre-scheduling resource allocation and/or pre-scheduling resource release signaling, the response information being used to indicate that the UE has successfully received and/or applied the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the method further comprises receiving a request regarding UE capability information, wherein the UE capability information is transmitted in response to the request.

In one embodiment, the UE capability information is included in a radio resource control (RRC) message.

In one embodiment, the RRC message is a UE capability information message.

Figure 2:
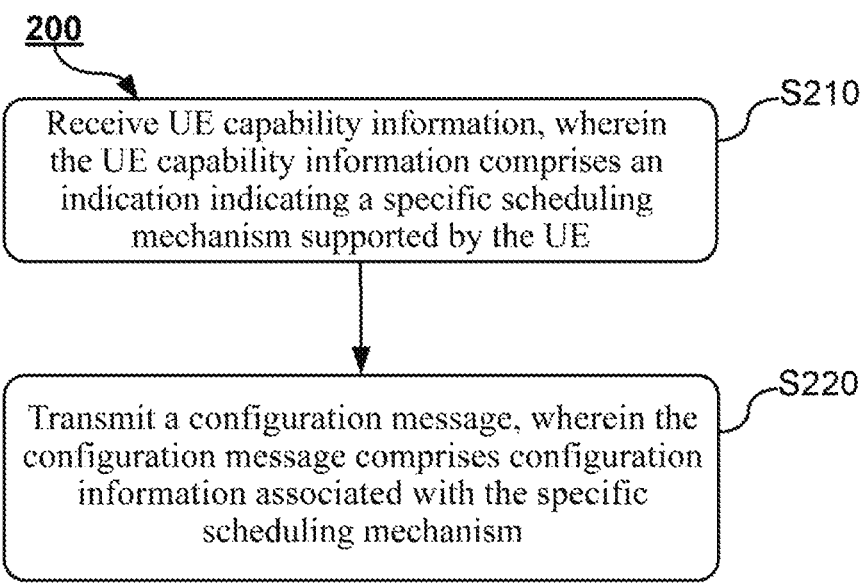
FIG. 2 is a flowchart of a method in a base station according to the present invention.

FIG. 2 is a flowchart of a method 200 in a base station according to the present invention. The method 200 include the following steps.

Step S210: Receive UE capability information, wherein the UE capability information comprises an indication indicating a specific scheduling mechanism supported by the UE.

Step S220: Transmit a configuration message, wherein the configuration message comprises configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with a interval of 1 ms or of a transmission time interval (TTI).

In one embodiment, the specific scheduling mechanism comprises a transmission disable mechanism for Media Access Control (MAC).

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a response information mechanism for pre-scheduling resource allocation and/or release.

In one embodiment, the response information mechanism for pre-scheduling resource allocation and/or release comprises: replying with response information at a next available uplink moment when the UE receives the pre-scheduling resource allocation and/or pre-scheduling resource release signaling, the response information being used to indicate that the UE has successfully received and/or applied the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the method further comprises: transmitting a request regarding UE capability information.

In one embodiment, the UE capability information is included in a radio resource control (RRC) message.

In one embodiment, the RRC message is a UE capability information message.

The methods 100 and 200 described above are further illustrated with reference to the following embodiments.

Embodiment 1

Figure 3:
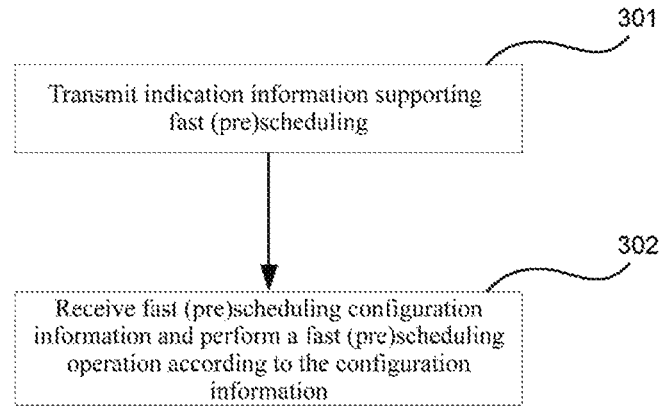
FIG. 3 is a flowchart of a method in a UE according to Embodiment 1 of the present invention.

FIG. 3 is a flowchart of a method in a UE according to Embodiment 1 of the present invention.

Step 301: The UE transmits a report message including indication information that the UE supports fast (pre)scheduling, wherein the indication information is used to indicate to an eNB a capability of the UE for supporting a fast (pre)scheduling mechanism.

Step 302: The UE receives a configuration message including fast (pre)scheduling configuration information. The UE performs a fast (pre)scheduling operation according to the configuration information.

Step 302 is an optional step; that is, after completing step 301, the UE may not receive the configuration message described in the step 302.

In this embodiment, the fast pre-scheduling mechanism may be a semi-persistent scheduling (SPS) mechanism with an interval of 1 ms or of 1 transmission time interval (TTI). Further, the fast (pre)scheduling mechanism in this embodiment may be a fast uplink (pre)scheduling mechanism.

The report message transmitted by the UE may be an RRC message, or it may further be a UE capability information message. The description above shows only some examples of message implementations, and is not limited thereto.

The configuration message received by the UE may be an RRC message or it may further be an RRC Connection Reconfiguration message.

In this embodiment, before step 301, the UE receives an inquiry message that is used to query the UE capability information. The message may be a UE capability enquiry message.

Figure 4:
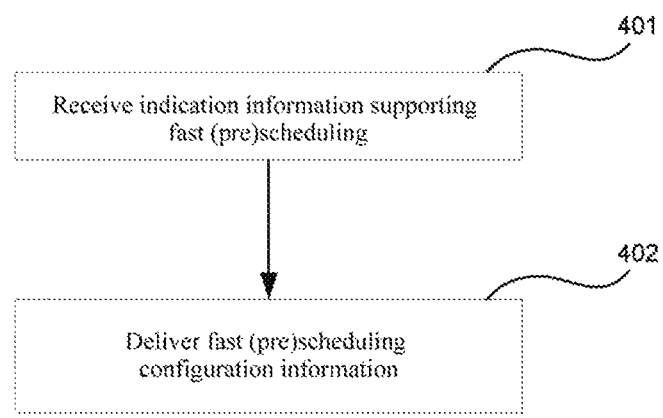
FIG. 4 is a flowchart of a method in a base station according to Embodiment 1 of the present invention.

FIG. 4 is a flowchart of a method in a base station according to Embodiment 1 of the present invention.

Step 401: The eNB receives a report message including indication information that the UE supports fast (pre)scheduling, wherein the indication information is used to indicate to the eNB a capability of the UE for supporting a fast (pre)scheduling mechanism.

Step 402: The eNB delivers a configuration message including fast (pre)scheduling configuration information. The fast (pre)scheduling configuration information is used to configure the UE to perform a fast (pre)scheduling operation according to the configuration information.

Step 402 is an optional step; that is, after completing step 401, the eNB may choose not to deliver the configuration message described in the step 402, which is determined by a scheduling algorithm on the eNB.

In this embodiment, the fast pre-scheduling mechanism may be a semi-persistent scheduling (SPS) mechanism with an interval of 1 ms or of 1 transmission time interval (TTI). Further, the fast (pre)scheduling mechanism in this embodiment may be a fast uplink (pre)scheduling mechanism.

The report message transmitted by the UE may be an RRC message, or it may further be a UE capability information message. The description above shows only some examples of message implementations, and is not limited thereto.

The configuration message received by the UE may be an RRC message or it may further be an RRC Connection Reconfiguration message.

In this embodiment, before step 401, the eNB delivers an inquiry message that is used to query the UE capability information. The message may be a UE capability enquiry message.

Figure 5:
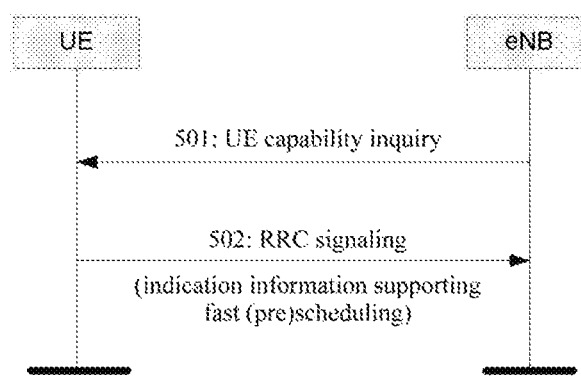
FIG. 5 is a sequence diagram of interaction between the UE and the base station according to Embodiment 1 of the present invention.

FIG. 5 is a sequence diagram of interaction between the UE and the base station according to Embodiment 1 of the present invention.

Step 501: The eNB transmits an inquiry message to the UE for querying the capability of the UE. The message may be a UE capability enquiry message.

Step 502: The UE transmits to the eNB a report message including indication information that the UE supports fast (pre)scheduling, wherein the indication information is used to indicate to the eNB a capability of the UE for supporting a fast (pre)scheduling mechanism.

In this embodiment, the fast pre-scheduling mechanism may be a semi-persistent scheduling (SPS) mechanism with an interval of 1 ms or of 1 transmission time interval (TTI). Further, the fast (pre)scheduling mechanism in this embodiment may be a fast uplink (pre)scheduling mechanism.

The report message transmitted by the UE may be an RRC message, or it may further be a UE capability information message. The description above shows only some examples of message implementations, and is not limited thereto.

Through this process, the eNB determines whether the UE has the capability to support the fast (pre)scheduling mechanism, so as to determine whether to configure the fast (pre)scheduling mechanism for the UE based on a scheduling policy on the eNB.

Embodiment 2

Figure 6:
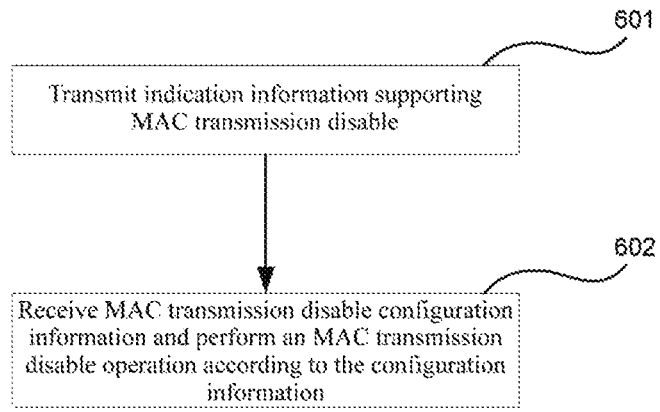
FIG. 6 is a flowchart of a method in a UE according to Embodiment 2 of the present invention.

FIG. 6 is a flowchart of a method in UE according to Embodiment 2 of the present invention.

Step 601: The UE transmits a report message including indication information that the UE supports a transmission disable mechanism for Media Access Control, and the indication information is used to indicate to the eNB a capability of the UE for supporting the transmission disable mechanism for MAC.

Step 602: The UE receives a configuration message including configuration information. According to the configuration information, the UE disables the corresponding MAC transmission when conditions are met.

Step 602 is an optional step; that is, after completing step 601, the UE may not receive the configuration message described in the step 602.

The following is an explanation of the transmission disable mechanism for MAC in this embodiment.

1) Disabling SPS uplink transmission including zero MAC SDU (Service Data Unit). That is, on the currently configured SPS resource, if the UE does not have any MAC SDU for transmission, the UE skips the transmission; that is, uplink transmission is not performed on the configured SPS resource.

2) Disabling SPS uplink transmission including only padding bits. That is, on the currently configured SPS resource, if an MAC packet transmitted by the UE only includes padding bits or padding Buffer Status Report (BSR), the UE skips the transmission; that is, uplink transmission is not performed on the configured SPS resource.

3) Grant drop. That is, on the currently configured SPS resource, if there is no data for transmission on the UE, the UE skips the allocated grant, i.e., drops the grant, skips the uplink transmission on a resource corresponding to the grant.

4) Disabling empty transmission. That is, on the currently configured SPS resource, if the UE buffer is empty, the UE does not perform empty transmission on the allocated resource.

It should be noted that the transmission disable mechanism for MAC in this embodiment is not limited to be applicable to the SPS mechanism; rather, the transmission disable mechanism for MAC is also applicable to other scheduling methods such as dynamic scheduling.

The report message transmitted by the UE may be an RRC message, or it may further be a UE capability information message. The description above shows only some examples of message implementations, and is not limited thereto.

The configuration message received by the UE may be an RRC message or it may further be an RRC Connection Reconfiguration message.

In this embodiment, before step 601, the UE receives an inquiry message that is used to query the UE capability information. The message may be a UE capability enquiry message.

Figure 7:
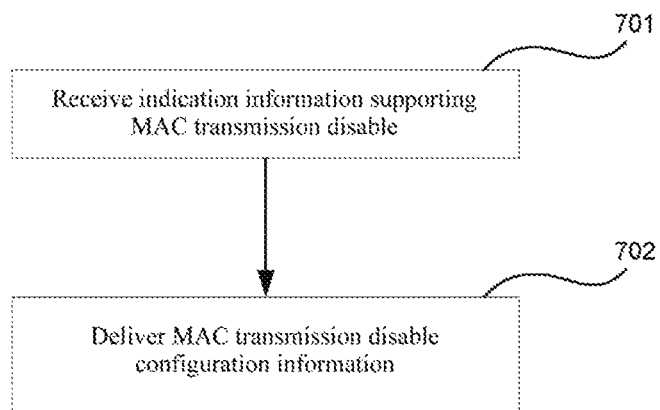
FIG. 7 is a flowchart of a method in a base station according to Embodiment 2 of the present invention.

FIG. 7 is a flowchart of a method in a base station according to Embodiment 2 of the present invention.

Step 701: The eNB receives a report message including indication information that the UE supports a transmission disable mechanism for Media Access Control, and the indication information is used to indicate to the eNB a capability of the UE for supporting the transmission disable mechanism for MAC.

Step 702: The eNB delivers a configuration message including transmission disable configuration information for MAC, indicating that the UE to disable the corresponding MAC transmission based on the configuration information when conditions are met.

Step 702 is an optional step; that is, after completing step 701, the UE may not receive the configuration message described in the step 702.

The following is an explanation of the transmission disable mechanism for MAC in this embodiment.

1) Disabling SPS uplink transmission including zero MAC SDU (Service Data Unit). That is, on the currently configured SPS resource, if the UE does not have any MAC SDU for transmission, the UE skips the transmission; that is, uplink transmission is not performed on the configured SPS resource. For the eNB, if the eNB does not receive uplink transmission from the UE on the configured SPS resource, the eNB determines that the UE does not have MAC SDU to transmit at this time point.

2) Disabling SPS uplink transmission including only padding bits. That is, on the currently configured SPS resource, if an MAC packet transmitted by the UE only includes padding bits or padding BSR, the UE skips the transmission; that is, uplink transmission is not performed on the configured SPS resource. For the eNB, if the eNB does not receive uplink transmission from the UE on the configured SPS resource, the eNB considers that the UE has disabled uplink transmission including only padding bits at this time point.

3) Grant drop. That is, on the currently configured SPS resource, if there is no data for transmission on the UE, the UE skips the allocated grant, i.e., drops the grant, skips the uplink transmission on a resource corresponding to the grant. For the eNB, if the eNB does not receive uplink transmission from the UE on the configured SPS resource, the eNB determines that the UE performs dropping the grant.

4) Disabling empty transmission. That is, on the currently configured SPS resource, if the UE buffer is empty, the UE does not perform empty transmission on the allocated resource. For the eNB, if the eNB does not receive uplink transmission from the UE on the configured SPS resource, the eNB determines that the UE buffer is empty and empty transmission is not performed.

It should be noted that the transmission disable mechanism for MAC in this embodiment is not limited to be applicable to the SPS mechanism; rather, the transmission disable mechanism for MAC is also applicable to other scheduling methods such as dynamic scheduling.

The report message received by the eNB may be an RRC message, or it may further be a UE capability information message. The description above shows only some examples of message implementations, and is not limited thereto.

The configuration message delivered by the eNB may be an RRC message or it may further be an RRC Connection Reconfiguration message.

In this embodiment, before step 701, the UE receives an inquiry message that is used to query the UE capability information. The message may be a UE capability enquiry message.

Figure 8:
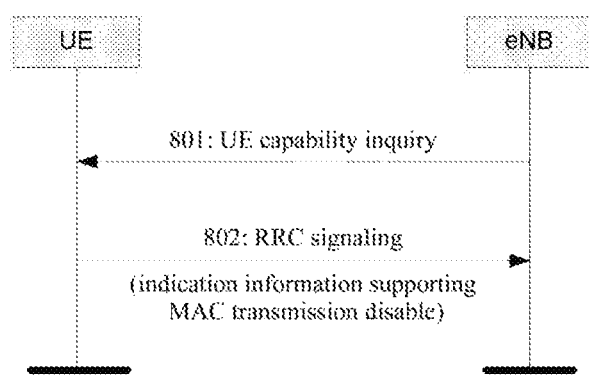
FIG. 8 is a sequence diagram of interaction between the UE and the base station according to Embodiment 2 of the present invention.

FIG. 8 is a sequence diagram of interaction between the UE and the base station according to Embodiment 2 of the present invention.

Step 801: The eNB transmits an inquiry message to the UE for querying the capability of the UE. The message may be a UE capability enquiry message.

Step 802: The UE transmits to eNB a report message including indication information that the UE supports a transmission disable mechanism for Media Access Control, and the indication information is used to indicate to the eNB a capability of the UE for supporting the transmission disable mechanism for MAC.

The following is an explanation of the transmission disable mechanism for MAC in this embodiment.

1) Disabling SPS uplink transmission including zero MAC SDU (Service Data Unit). That is, on the currently configured SPS resource, if the UE does not have any MAC SDU for transmission, the UE skips the transmission; that is, uplink transmission is not performed on the configured SPS resource. For the eNB, if the eNB does not receive uplink transmission from the UE on the configured SPS resource, the eNB determines that the UE does not have MAC SDU to transmit at this time point.

2) Disabling SPS uplink transmission including only padding bits. That is, on the currently configured SPS resource, if an MAC packet transmitted by the UE only includes padding bits or padding BSR, the UE skips the transmission; that is, uplink transmission is not performed on the configured SPS resource. For the eNB, if the eNB does not receive uplink transmission from the UE on the configured SPS resource, the eNB considers that the UE has disabled uplink transmission including only padding bits at this time point.

3) Grant drop. That is, on the currently configured SPS resource, if there is no data for transmission on the UE, the UE skips the allocated grant, i.e., drops the grant, skips the uplink transmission on a resource corresponding to the grant. For the eNB, if the eNB does not receive uplink transmission from the UE on the configured SPS resource, the eNB determines that the UE performs dropping the grant.

4) Disabling empty transmission. That is, on the currently configured SPS resource, if the UE buffer is empty, the UE does not perform empty transmission on the allocated resource. For the eNB, if the eNB does not receive uplink transmission from the UE on the configured SPS resource, the eNB determines that the UE buffer is empty and empty transmission is not performed.

It should be noted that the transmission disable mechanism for MAC in this embodiment is not limited to be applicable to the SPS mechanism; rather, the transmission disable mechanism for MAC is also applicable to other scheduling methods such as dynamic scheduling.

The report message received by the eNB may be an RRC message, or it may further be a UE capability information message. The description above shows only some examples of message implementations, and is not limited thereto.

Through this process, the eNB determines whether the UE has the capability to support the transmission mechanism for MAC, so as to determine whether to configure the UE with a disabling transmission mechanism for MAC based on a scheduling policy on the eNB.

Embodiment 3

Figure 9:
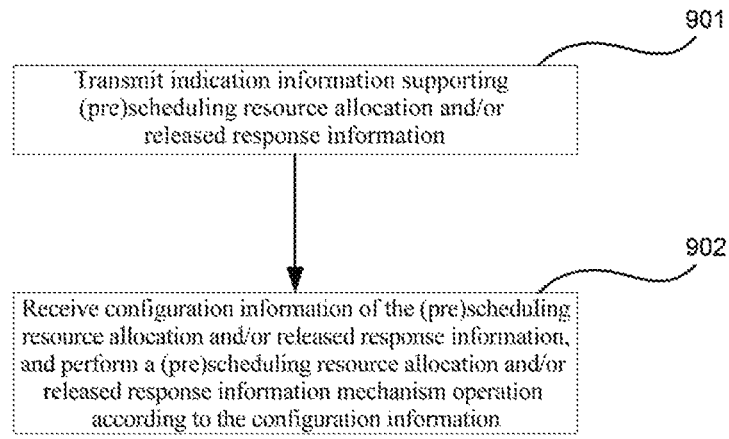
FIG. 9 is a flowchart of a method in a UE according to Embodiment 3 of the present invention.

FIG. 9 is a flowchart of a method in UE according to Embodiment 3 of the present invention.

Step 901: The UE transmits a report message including indication information that the UE supports a response information mechanism for (pre)scheduling resource allocation and/or release. The indication information is used to indicate to the eNB the capability of the UE for supporting the response information mechanism for (pre)scheduling resource allocation and/or release.

Step 902: The UE receives a configuration message including configuration information of the response information mechanism for (pre)scheduling resource allocation and/or release. The configuration information is used to enable the response information mechanism for (pre)scheduling resource allocation and/or release at the UE.

Step 902 is an optional step; that is, after completing step 901, the UE may not receive the configuration message described in the step 902.

In this embodiment, the (pre)scheduling resource allocation signaling is used to allocate and activate (pre)scheduling resources for the UE. The (pre)scheduling resource release signaling is used to indicate to the UE to release the allocated (pre)scheduling resources.

The response information mechanism for (pre)scheduling resource allocation and/or release in this embodiment may be explained as follows.

1) When receiving (pre)scheduling resource allocation signaling, the UE needs to reply response information to the eNB at a next available uplink moment, and the response information is used to notify the eNB that the UE has successfully received and/or applied the (pre)scheduling resource allocation signaling.

2) When receiving (pre)scheduling resource release signaling, the UE needs to reply response information to the eNB at a next available uplink moment, and the response information is used to notify the eNB that the UE has successfully received and/or applied the (pre)scheduling resource release signaling.

3) When receiving the (pre)scheduling resource allocation signaling and the release signaling, the UE needs to reply response information to the eNB at the next available uplink moment. The response information is used to notify the eNB that the UE has successfully received and/or applied the (pre)scheduling resource allocation signaling and the release signaling. In 3), the UE needs to reply the response information to the eNB when receiving the (pre)scheduling resource allocation signaling and the UE also needs to reply the response information to the eNB when receiving the (pre)scheduling resource release signaling, which is different from items 1 and 2.

The first available uplink moment above may be a first available resource corresponding to the configured scheduling resource after the UE receives the (pre)scheduling resource allocation signaling and the release signal.

The response information in this embodiment may be in an HARQ (Hybrid Automatic Repeat Request) ACK/NACK manner, in an MAC CE (control element) form; or the response information can be the physical layer signaling, or in an MAC data packet form. The MAC data packet may include or not include an MAC SDU, or only include padding bits. For example, if the response information is in an MAC CE form, the MAC CE may be a newly defined MAC CE and corresponds to a newly defined Logical Channel Identity (LCD).

It should be noted that the (pre)scheduling resource allocation and/or released response information mechanism in this embodiment is not limited to be applicable to the SPS mechanism, but is also applicable to other scheduling methods such as dynamic scheduling.

The report message transmitted by the UE may be an RRC message, or it may further be a UE capability information message. The description above shows only some examples of message implementations, and is not limited thereto.

The configuration message received by the UE may be an RRC message or it may further be an RRC Connection Reconfiguration message; that is, the eNB enables the (pre) scheduling resource allocation and/or released response information mechanism of the UE via the RRC message.

In this embodiment, before step 901, the UE receives an inquiry message that is used to query the UE capability information. The message may be a UE capability enquiry message.

Figure 10:
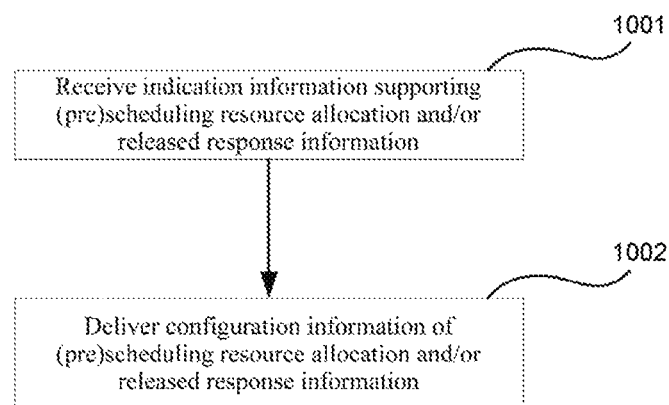
FIG. 10 is a flowchart of a method in a base station according to Embodiment 3 of the present invention.

FIG. 10 is flowchart of a method in a base station according to Embodiment 3 of the present invention.

Step 1001: The eNB receives a report message including indication information that the UE supports a response information mechanism for (pre)scheduling resource allocation and/or release. The indication information is used to indicate to the eNB the capability of the UE for supporting the response information mechanism for (pre)scheduling resource allocation and/or released.

Step 1002: The eNB delivers a configuration message including configuration information of the response information mechanism for (pre)scheduling resource allocation and/or release. The configuration information is used to enable the response information mechanism for (pre)scheduling resource allocation and/or released at the UE.

Step 1002 is an optional step; that is, after completing step 1001, the UE may not receive the configuration message described in the step 1002.

In this embodiment, the (pre)scheduling resource allocation signaling is used to allocate and activate (pre)scheduling resources for the UE. The (pre)scheduling resource release signaling is used to indicate to the UE to release the allocated (pre)scheduling resources.

The (pre)scheduling resource allocation and/or released response information mechanism in this embodiment may be explained as follows.

1) When receiving (pre)scheduling resource allocation signaling, the UE needs to reply response information to the eNB at a next available uplink moment, and the response information is used to notify the eNB that the UE has successfully received and/or applied the (pre)scheduling resource allocation signaling. For the eNB, after eNB delivers the (pre)scheduling resource allocation signaling, the eNB receives a response message at a next available uplink moment; and based on this, the eNB learns that the UE has successfully received and/or applied the (pre)scheduling resource allocation signaling.

2) When receiving (pre)scheduling resource release signaling, the UE needs to reply response information to the eNB at a next available uplink moment, and the response information is used to notify the eNB that the UE has successfully received and/or applied the (pre)scheduling resource release signaling. For the eNB, after eNB delivers the (pre)scheduling resource release signaling, the eNB receives a response message at a next available uplink moment; and based on this, the eNB learns that the UE has successfully received and/or applied the (pre)scheduling resource release signaling.

3) When receiving the (pre)scheduling resource allocation signaling and the release signaling, the UE needs to reply response information to the eNB at the next available uplink moment. The response information is used to notify the eNB that the UE has successfully received and/or applied the (pre)scheduling resource allocation signaling and the release signaling. In 3), the UE needs to reply the response information to the eNB when receiving the (pre)scheduling resource allocation signaling and the UE also needs to reply the response information to the eNB when receiving the (pre)scheduling resource release signaling, which is different from items 1 and 2. For the eNB, after the eNB delivers the (pre)scheduling resource allocation signaling and the release signaling, the eNB expects to receive a response message at a next available uplink moment; based on this, the eNB then learns that the UE has successfully received and/or applied the (pre)scheduling resource allocation and release signaling; otherwise, the eNB considers that the UE does not successfully receive and/or apply the (pre)scheduling resource allocation and release signaling. In this item, the eNB expects to receive the response information after delivering the (pre)scheduling resource allocation signaling, and to receive the response information after delivering the (pre)scheduling resource release signaling.

The first available uplink moment above may be a first available resource corresponding to the configured scheduling resource after the UE receives the (pre)scheduling resource allocation signaling and the release signal.

The response information in this embodiment may be in an HARQ (Hybrid Automatic Repeat Request) ACK/NACK manner, in an MAC CE (control element) form; or the response information can be the physical layer signaling, or in an MAC data packet form. The MAC data packet may include or not include an MAC SDU, or only include padding bits. For example, if the response information is in an MAC CE form, the MAC CE may be a newly defined MAC CE and corresponds to a newly defined Logical Channel Identity (LCD).

It should be noted that the (pre)scheduling resource allocation and/or released response information mechanism in this embodiment is not limited to be applicable to the SPS mechanism, but is also applicable to other scheduling methods such as dynamic scheduling.

The report message received by the eNB may be an RRC message, or it may further be a UE capability information message. The description above shows only some examples of message implementations, and is not limited thereto.

The configuration message delivered by the eNB may be an RRC message or it may further be an RRC Connection Reconfiguration message; that is, the eNB enables the (pre) scheduling resource allocation and/or released response information mechanism of the UE via the RRC message.

In this embodiment, before step 1001, an inquiry message is transmitted to the UE to query the UE capability information. The message may be a UE capability enquiry message.

Figure 11:
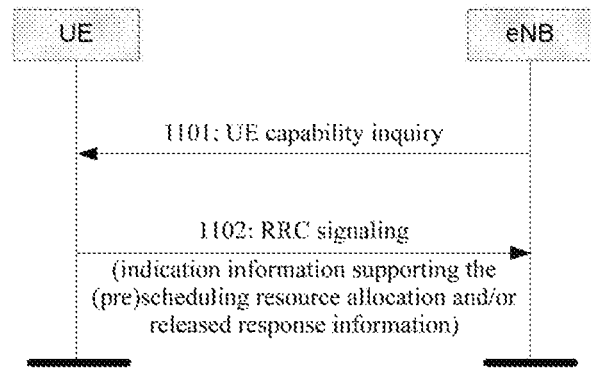
FIG. 11 is a sequence diagram of interaction between the UE and the base station according to Embodiment 3 of the present invention.

FIG. 11 is a sequence diagram of interaction between the UE and the base station according to Embodiment 3 of the present invention.

Step 1101: The eNB transmits an inquiry message to the UE for querying the capability of the UE. The message may be a UE capability enquiry message.

Step 1102: The UE transmits to the eNB a report message including indication information that the UE supports a response information mechanism for (pre)scheduling resource allocation and/or release. The indication information is used to indicate to the eNB the capability of the UE for supporting the response information mechanism for (pre)scheduling resource allocation and/or release.

In this embodiment, the (pre)scheduling resource allocation signaling is used to allocate and activate (pre)scheduling resources for the UE. The (pre)scheduling resource release signaling is used to indicate to the UE to release the allocated (pre)scheduling resources.

The response information mechanism for (pre)scheduling resource allocation and/or release in this embodiment may be explained as follows.

1) When receiving (pre)scheduling resource allocation signaling, the UE needs to reply response information to the eNB at a next available uplink moment, and the response information is used to notify the eNB that the UE has successfully received and/or applied the (pre)scheduling resource allocation signaling. For the eNB, after eNB delivers the (pre)scheduling resource allocation signaling, the eNB receives a response message at a next available uplink moment; and based on this, the eNB learns that the UE has successfully received and/or applied the (pre)scheduling resource allocation signaling.

2) When receiving (pre)scheduling resource release signaling, the UE needs to reply response information to the eNB at a next available uplink moment, and the response information is used to notify the eNB that the UE has successfully received and/or applied the (pre)scheduling resource release signaling. For the eNB, after eNB delivers the (pre)scheduling resource release signaling, the eNB receives a response message at a next available uplink moment; and based on this, the eNB learns that the UE has successfully received and/or applied the (pre)scheduling resource release signaling.

3) When receiving the (pre)scheduling resource allocation signaling and the release signaling, the UE needs to reply response information to the eNB at the next available uplink moment. The response information is used to notify the eNB that the UE has successfully received and/or applied the (pre)scheduling resource allocation signaling and the release signaling. In 3), the UE needs to reply the response information to the eNB when receiving the (pre)scheduling resource allocation signaling and the UE also needs to reply the response information to the eNB when receiving the (pre)scheduling resource release signaling, which is different from items 1 and 2. For the eNB, after the eNB delivers the (pre)scheduling resource allocation signaling and the release signaling, the eNB expects to receive a response message at a next available uplink moment; based on this, the eNB then learns that the UE has successfully received and/or applied the (pre)scheduling resource allocation and release signaling; otherwise, the eNB considers that the UE does not successfully receive and/or apply the (pre)scheduling resource allocation and release signaling. In this item, the NB expects to receive the response information after delivering the (pre)scheduling resource allocation signaling, and to receive the response information after delivering the (pre)scheduling resource release signaling.

The first available uplink moment above may be a first available resource corresponding to the configured scheduling resource after the UE receives the (pre)scheduling resource allocation signaling and the release signal.

The response information in this embodiment may be in an HARQ (Hybrid Automatic Repeat Request) ACK/NACK manner, in an MAC CE (control element) form; or the response information can be the physical layer signaling, or in an MAC data packet form. The MAC data packet may include or not include an MAC SDU, or only include padding bits. For example, if the response information is in an MAC CE form, the MAC CE may be a newly defined MAC CE and corresponds to a newly defined Logical Channel Identity (LCD).

It should be noted that the response information mechanism for (pre)scheduling resource allocation and/or release in this embodiment is not limited to be applicable to the SPS mechanism, but is also applicable to other scheduling methods such as dynamic scheduling.

The report message received by the eNB may be an RRC message, or it may further be a UE capability information message. The description above shows only some examples of message implementations, and is not limited thereto.

The configuration message delivered by the eNB may be an RRC message or it may further be an RRC Connection Reconfiguration message; that is, the eNB enables the response information mechanism for (pre)scheduling resource allocation and/or release for the UE via the RRC message.

Through this process, the eNB may determine whether the UE supports the response information mechanism for (pre)scheduling resource allocation and/or release, so as to determine whether to expect to receive the response information of the UE after delivering the (pre)scheduling resource allocation and/or release signaling. Optionally, the eNB may use RRC signaling such as an RRC Connection Reconfiguration message to enable the response information mechanism for (pre)scheduling resource allocation and/or released of the UE.

Embodiment 4

Figure 12:
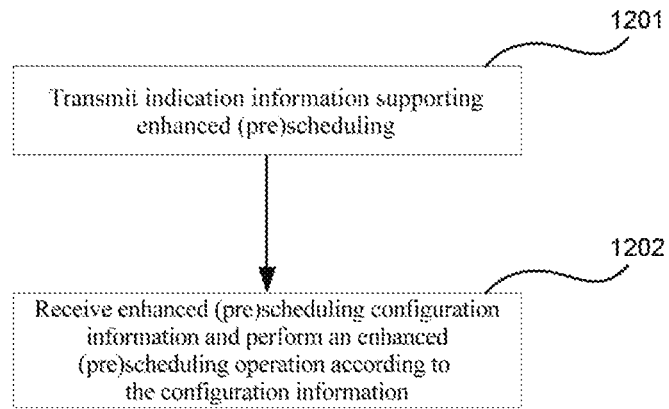
FIG. 12 is a flowchart of a method in a UE according to Embodiment 4 of the present invention.

FIG. 12 is a flowchart of a method in UE according to Embodiment 4 of the present invention.

Step 1201: The UE transmits a report message including indication information that the UE supports enhanced (pre)scheduling, wherein the indication information is used to indicate to an eNB a capability of the UE for supporting an enhanced (pre)scheduling mechanism.

Step 1202: The UE receives a configuration message including enhanced (pre)scheduling configuration information. The UE performs an enhanced (pre)scheduling operation according to the configuration information.

Step 1202 is an optional step; that is, after completing step 1201, the UE may not receive the configuration message described in the step 1202.

In this embodiment, the enhanced (pre)scheduling mechanism may be a semi-persistent scheduling (SPS) mechanism with a shorter interval, such as SPS with a interval of 1 ms or of 1 transmission time interval (TTI); SPS with a interval of one or more of any combination of 1 ms, 2 ms, 3 ms, 4 ms, 5 ms, 6 ms, 8 ms; or a contention-based uplink resource scheduling mechanism. Further, the enhanced (pre)scheduling mechanism in this embodiment may be an enhanced uplink (pre)scheduling mechanism. The enhanced (pre)scheduling mechanism in this embodiment is not limited to the above scheduling manner; for example, it may be dynamic scheduling.

The report message transmitted by the UE may be an RRC message, or it may further be a UE capability information message. The description above are only implementation examples of the configuration message, but the configuration message is not limited thereto.

The configuration message received by the UE may be an RRC message or it may further be an RRC Connection Reconfiguration message.

In this embodiment, before step 1201, the UE receives an inquiry message that is used to query the UE capability information. The message may be a UE capability enquiry message.

Figure 13:
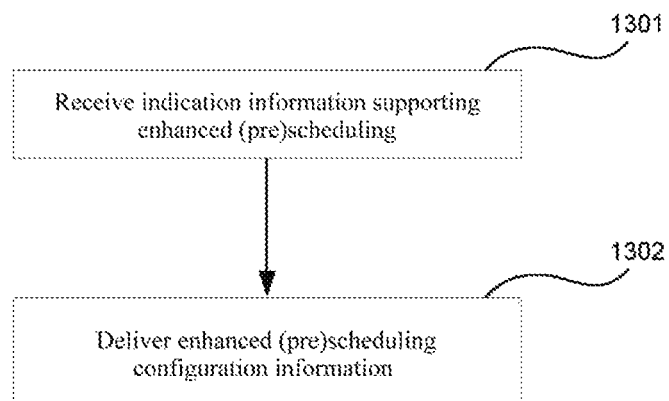
FIG. 13 is a flowchart of a method in a base station according to Embodiment 4 of the present invention.

FIG. 13 is flowchart of a method in a base station according to Embodiment 4 of the present invention.

Step 1301: The eNB receives a report message including indication information that the UE supports enhanced (pre)scheduling, wherein the indication information is used to indicate to the eNB a capability of the UE for supporting an enhanced (pre)scheduling mechanism.

Step 1302: The eNB delivers a configuration message including enhanced (pre)scheduling configuration information. The message is used to configure the UE to perform an enhanced (pre)scheduling operation according to the configuration information.

Step 1302 is an optional step; that is, after completing step 1301, the eNB may choose not to deliver the configuration message described in the step 1302, which is determined by a scheduling algorithm on the eNB.

In this embodiment, the enhanced (pre)scheduling mechanism may be a semi-persistent scheduling (SPS) mechanism with a shorter interval, such as SPS with a interval of 1 ms or of 1 transmission time interval (TTI); SPS with a interval of one or more of any combination of 1 ms, 2 ms, 3 ms, 4 ms, 5 ms, 6 ms, 8 ms; or a contention-based uplink resource scheduling mechanism. Further, the enhanced (pre)scheduling mechanism in this embodiment may be an enhanced uplink (pre)scheduling mechanism. The enhanced (pre)scheduling mechanism in this embodiment is not limited to the above scheduling manner; for example, it may be dynamic scheduling.

The report message received by the eNB may be an RRC message, or it may further be a UE capability information message. The description above are only implementation examples of the configuration message, but the configuration message is not limited thereto.

The configuration message transmitted by the UE may be an RRC message or it may further be an RRC Connection Reconfiguration message.

In this embodiment, before step 1301, the eNB delivers an inquiry message that is used to query the UE capability information. The message may be a UE capability enquiry message.

Figure 14:
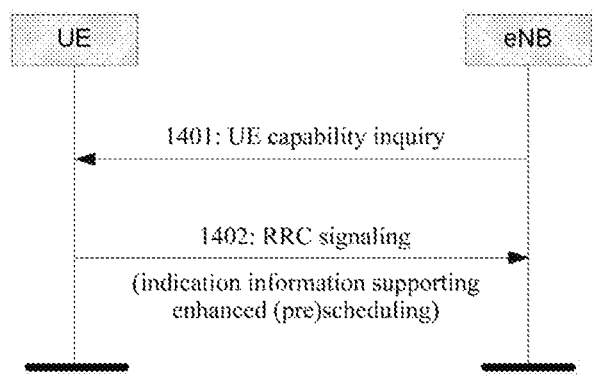
FIG. 14 is a sequence diagram of interaction between the UE and the base station according to Embodiment 4 of the present invention.

FIG. 14 is a sequence diagram of interaction between the UE and the base station according to Embodiment 4 of the present invention.

Step 1401: The eNB transmits an inquiry message to the UE for querying the capability of the UE. The message may be a UE capability enquiry message.

Step 1402: The UE transmits to the eNB a report message including indication information that the UE supports enhanced (pre)scheduling, wherein the indication information is used to indicate to an eNB a capability of the UE for supporting an enhanced (pre)scheduling mechanism.

In this embodiment, the enhanced (pre)scheduling mechanism may be a semi-persistent scheduling (SPS) mechanism with a shorter interval, such as SPS with a interval of 1 ms or of 1 transmission time interval (TTI); SPS with a interval of one or more of any combination of 1 ms, 2 ms, 3 ms, 4 ms, 5 ms, 6 ms, 8 ms; or a contention-based uplink resource scheduling mechanism. Further, the enhanced (pre)scheduling mechanism in this embodiment may be an enhanced uplink (pre)scheduling mechanism. The enhanced (pre)scheduling mechanism in this embodiment is not limited to the above scheduling manner; for example, it may be dynamic scheduling.

The report message transmitted by the UE may be an RRC message, or it may further be a UE capability information message. The description above are only implementation examples of the configuration message, but the configuration message is not limited thereto.

Through this process, the eNB determines whether the UE has the capability to support the enhanced (pre)scheduling mechanism, so as to determine whether to configure the enhanced (pre)scheduling mechanism for the UE based on a scheduling policy on the eNB.

Below is an example of an implementation of reporting UE capability information in a 3GPP protocol. The example information format is as follows:

```
UE-EUTRA-capability-v14xy-IEs ::=SEQUENCE{
    latred-Parameters-v14xy      LATRED-Parameters-v14xy
    OPTIONAL,
    nonCriticalExtension         SEQUENCE { }
        OPTIONAL
}
LATRED-Parameters-v14xy ::=   SEQUENCE {
    fastULscheduling-v14xy           ENUMERATED {supported}
    OPTIONAL,
    MACtransdisable-v14xy            ENUMERATED {supported}
    OPTIONAL
    SPSactdearesp-v14xy              ENUMERATED {supported}
        OPTIONAL
    ......
}
```

The description of the above information elements is provided as follows:

| UE-EUTRAN-capability field descriptions | FDD/ TDD diff |
|---|---|
| FastULscheduling Indicates whether the UE supports fastULscheduling. | — |
| MACtransdisable Indicates whether the UE support MACtransdisable | — |
| SPSactdearesp Indicates whether the UE support SPSactdearesp | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre) scheduling mechanism capability. It may also be named mac-Parameters-v14xy, which is considered as capability extension of an MAC layer of the UE. The same is true for other information elements.

In addition, fastULscheduling may correspond to the UE capability in Embodiments 1 and 4 of the present invention, i.e., indicating whether the UE supports the fast (pre) scheduling or enhanced (pre)scheduling mechanism. Further, the information element may also be named shortSPS, indicating whether the UE supports a short interval SPS such as SPS with an interval of 1 ms. MACtransdisable may correspond to the UE capability in Embodiment 2 of the present invention, i.e., indicating whether the UE supports a disable MAC transmission mechanism. According to different interpretations of the mechanism, the information element may be named zeroMACSDUdisable, paddingonlydisable, emptytransdisable, or grantdrop. SPSactdearesp may correspond to the UE capability in Embodiment 3 of the present invention, i.e., indicating whether the UE supports the response information mechanism for (pre)scheduling resource allocation and/or release.

In addition, it should be noted that this embodiment supports that the sub information elements fastULscheduling, MACtransdisable, and SPSactdearesp being directly included in the information element UE-EUTRA-Capability, which is an information element indication without needing an intermediate information element latred-Parameters.

Below is another example of an implementation of reporting UE capability information in a 3GPP protocol. The example information format is as follows:

```
UE-EUTRA-Capability-v14xy-IEs ::=SEQUENCE{
    latred-Parameters-v14xy      LATRED-Parameters-v14xy
    OPTIONAL,
    nonCriticalExtension         SEQUENCE { }
        OPTIONAL
}
LATRED-Parameters-v14xy ::=   SEQUENCE {
    fastULscheduling-v14xy           ENUMERATED {supported}
    OPTIONAL,
    ......
}
```

The description of the above information elements is provided as follows:

| UE-EUTRAN-capability field descriptions | FDD/ TDD diff |
|---|---|
| FastULscheduling Indicates whether the UE supports fastULscheduling. | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre) scheduling mechanism capability. It may also be named mac-Parameters-v14xy, which is considered as capability extension of an MAC layer of the UE. The same is true for other information elements.

In addition, fastULscheduling may correspond to the UE capability in Embodiments 1 and 4 of the present invention, i.e., indicating whether the UE supports the fast (pre) scheduling or enhanced (pre)scheduling mechanism. Further, the information element may also be named shortSPS, indicating whether the UE supports a short interval SPS such as SPS with a interval of 1 ms. Certainly, the information element is not limited to the name given above.

In addition, it should be noted that this embodiment supports that the sub information element fastULscheduling being directly included in the information element UE-EUTRA-Capability, which is an information element indication without an intermediate information element latred-Parameters.

Embodiment 7

Below is another example of an implementation of reporting UE capability information in a 3GPP protocol. The example information format is as follows:

```
UE-EUTRA-Capability-v14xy-IEs ::=SEQUENCE{
    latred-Parameters-v14xy      LATRED-Parameters-v14xy
    OPTIONAL,
    nonCriticalExtension         SEQUENCE { }
        OPTIONAL
}
LATRED-Parameters-v14xy ::=   SEQUENCE {
    fastULscheduling-v14xy           ENUMERATED {supported}
    OPTIONAL,
    MACtransdisable-v14xy            ENUMERATED {supported}
    OPTIONAL
    ......
}
```

The description of the above information elements is provided as follows:

| UE-EUTRAN-capability field descriptions | FDD/ TDD diff |
|---|---|
| FastULscheduling Indicates whether the UE supports fastULscheduling. | — |
| MACtransdisable Indicates whether the UE support MACtransdisable | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre) scheduling mechanism capability. It may also be named mac-Parameters-v14xy, which is considered as capability extension of an MAC layer of the UE. The same is true for other information elements.

In addition, fastULscheduling may correspond to the UE capability in Embodiments 1 and 4 of the present invention, i.e., indicating whether the UE supports the fast (pre) scheduling or enhanced (pre)scheduling mechanism. Further, the information element may also be named shortSPS, indicating whether the UE supports a short interval SPS such as SPS with an interval of 1 ms. MACtransdisable may correspond to the UE capability in Embodiment 2 of the present invention, i.e., indicating whether the UE supports a disable MAC transmission mechanism. According to different interpretations of the mechanism, the information element may be named zeroMACSDUdisable, paddingonlydisable, emptytransdisable, or grantdrop.

In addition, it should be noted that this embodiment supports that the sub information elements fastULscheduling and MACtransdisable being directly included in the information element UE-EUTRA-Capability, which is an information element indication without needing the intermediate information element latred-Parameters.

Below is another example of an implementation of reporting UE capability information in a 3GPP protocol. The example information format is as follows:

```
UE-EUTRA-Capability-v14xy-IEs ::=SEQUENCE{
    latred-Parameters-v14xy    LATRED-Parameters-v14xy
        OPTIONAL,
    nonCriticalExtension       SEQUENCE { }
        OPTIONAL
}
LATRED-Parameters-v14xy ::=    SEQUENCE {
    MACtransdisable-v14xy              ENUMERATED {supported}
        OPTIONAL
    ......
}
```

The description of the above information elements is provided as follows:

| UE-EUTRAN-capability field descriptions | FDD/ TDD diff |
|---|---|
| MACtransdisable Indicates whether the UE support MACtransdisable | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre) scheduling mechanism capability. It may also be named mac-Parameters-v14xy, which is considered as capability extension of an MAC layer of the UE. The same is true for other information elements.

In addition, MACtransdisable may correspond to the UE capability in Embodiment 2 of the present invention, i.e., indicating whether the UE supports a disable MAC transmission mechanism. According to different interpretations of the mechanism, the information element may be named zeroMACSDUdisable, paddingonlydisable, emptytransdisable, or grantdrop.

In addition, it should be noted that this embodiment supports that the sub information element MACtransdisable being directly included in the information element UE-EUTRA-Capability, which is an information element indication without needing the intermediate information element latred-Parameters.

Below is another example of an implementation of reporting UE capability information in a 3GPP protocol. The example information format is as follows:

```
UE-EUTRA-Capability-v14xy-IEs ::=SEQUENCE{
    latred-Parameters-v14xy    LATRED-Parameters-v14xy
        OPTIONAL,
    nonCriticalExtension       SEQUENCE { }
        OPTIONAL
}
LATRED-Parameters-v14xy ::=    SEQUENCE {
    MACtransdisable-v14xy              ENUMERATED {supported}
        OPTIONAL
    SPSactdearesp-v14xy                ENUMERATED {supported}
        OPTIONAL
    ......
}
```

The description of the above information elements is provided as follows:

| UE-EUTRAN-capability field descriptions | FDD/ TDD diff |
|---|---|
| MACtransdisable Indicates whether the UE support MACtransdisable | — |
| SPSactdearesp Indicates whether the UE support SPSactdearesp | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre) scheduling mechanism capability. It may also be named mac-Parameters-v14xy, which is considered as capability extension of an MAC layer of the UE. The same is true for other information elements.

In addition, MACtransdisable may correspond to the UE capability in Embodiment 2 of the present invention, i.e., indicating whether the UE supports a disable MAC transmission mechanism. According to different interpretations of the mechanism, the information element may be named zeroMACSDUdisable, paddingonlydisable, emptytransdisable, or grantdrop. SPSactdearesp may correspond to the UE capability in Embodiment 3 of the present invention, i.e., indicating whether the UE supports the (pre)scheduling resource allocation and/or released response information mechanism.

In addition, it should be noted that this embodiment supports that the sub information elements MACtransdisable and SPSactdearesp being directly included in the information element UE-EUTRA-Capability, which is an information element indication without needing the intermediate information element latred-Parameters.

Below is another example of an implementation of reporting UE capability information in a 3GPP protocol. The example information format is as follows:

```
UE-EUTRA-Capability-v14xy-IEs ::=SEQUENCE{
    latred-Parameters-v14xy      LATRED-Parameters-v14xy
    OPTIONAL,
    nonCriticalExtension         SEQUENCE { }
        OPTIONAL
}
LATRED-Parameters-v14xy ::=     SEQUENCE {
        SPSactdearesp-v14xy      ENUMERATED
{supported}    OPTIONAL
        ......
}
```

The description of the above information elements is provided as follows:

| UE-EUTRAN-capability field descriptions | FDD/TDD diff |
|---|---|
| SPSactdearesp Indicates whether the UE support SPSactdearesp | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre)scheduling mechanism capability. It may also be named mac-Parameters-v14xy, which is considered as capability extension of an MAC layer of the UE. The same is true for other information elements.

In addition, SPSactdearesp may correspond to the UE capability in Embodiment 3 of the present invention, i.e., indicating whether the UE supports the (pre)scheduling resource allocation and/or released response information mechanism.

In addition, it should be noted that this embodiment supports that the sub information element SPSactdearesp being directly included in the information element UE-EUTRA-Capability, which is an information element indication without needing the intermediate information element latred-Parameters.

Below is another example of an implementation of reporting UE capability information in a 3GPP protocol. The example information format is as follows:

```
UE-EUTRA-Capability-v14xy-IEs ::=SEQUENCE{
    latred-Parameters-v14xy      LATRED-Parameters-v14xy
    OPTIONAL,
    nonCriticalExtension         SEQUENCE { }
        OPTIONAL
}
LATRED-Parameters-v14xy ::=     SEQUENCE {
    fastULscheduling-v14xy       ENUMERATED {supported}
    OPTIONAL,
        SPSactdearesp-v14xy      ENUMERATED
{supported} OPTIONAL
        ......
}
```

The description of the above information elements are provided as follows:

| UE-EUTRAN-capability field descriptions | FDD/TDD diff |
|---|---|
| FastULscheduling Indicates whether the UE supports fastULscheduling. | — |
| SPSactdearesp Indicates whether the UE support SPSactdearesp | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre)scheduling mechanism capability. It may also be named mac-Parameters-v14xy, which is considered as capability extension of an MAC layer of the UE. The same is true for other information elements.

In addition, fastULscheduling may correspond to the UE capability in Embodiments 1 and 4 of the present invention, i.e., indicating whether the UE supports the fast (pre)scheduling or enhanced (pre)scheduling mechanism. Further, the information element may also be named shortSPS, indicating whether the UE supports a short interval SPS such as SPS with a interval of 1 ms. SPSactdearesp may correspond to the UE capability in Embodiment 3 of the present invention, i.e., indicating whether the UE supports the (pre)scheduling resource allocation and/or released response information mechanism.

In addition, it should be noted that this embodiment supports that the sub information elements fastULscheduling and SPSactdearesp being directly included in the information element UE-EUTRA-Capability, which is an information element indication without needing the intermediate information element latred-Parameters.

Below is another example of an implementation of reporting UE capability information in a 3GPP protocol. The example information format is as follows:

```
UE-EUTRA-Capability-v14xy-IEs ::=SEQUENCE{
    latred-Parameters-v14xy      ENUMERATED {supported}
    OPTIONAL,
    nonCriticalExtension         SEQUENCE { }
        OPTIONAL
}
```

The description of the above information element is as follows:

| UE-EUTRAN-capability field descriptions | FDD/ TDD diff |
|---|---|
| Latred-parameter Indicates whether the UE supports latency reduction scheme. | — |

It should be noted that in this embodiment, the names of the information elements are merely examples and should not be limited to those provided. For example, the information element latred-Parameters-v14xy indicates a time delay reduction mechanism capability of the UE, such as the fast (pre)scheduling mechanism capability or the enhanced (pre) scheduling mechanism capability. It may also be named mac-Parameters-v14xy, which is considered as capability extension of an MAC layer of the UE. The information element may correspond to one or several combinations of UE capabilities in Embodiments 1 to 4 of the present invention. The information element may also correspond to the UE capability in Embodiments 1 and 4 of the present invention, i.e., indicating whether the UE supports the fast (pre)scheduling or enhanced (pre)scheduling mechanism. Further, the information element may also be named short-SPS, indicating whether the UE supports a short interval SPS such as SPS with an interval of 1 ms. It may also correspond to the UE capability in Embodiment 2 of the present invention, i.e., indicating whether the UE supports a disable MAC transmission mechanism. According to different interpretations of the mechanism, the information element may be named zeroMACSDUdisable, paddingonly-disable, emptytransdisable, or grantdrop. It may also correspond to the UE capability in Embodiment 3 of the present invention, i.e., indicating whether the UE supports the (pre)scheduling resource allocation and/or released response information mechanism.

Figure 15:
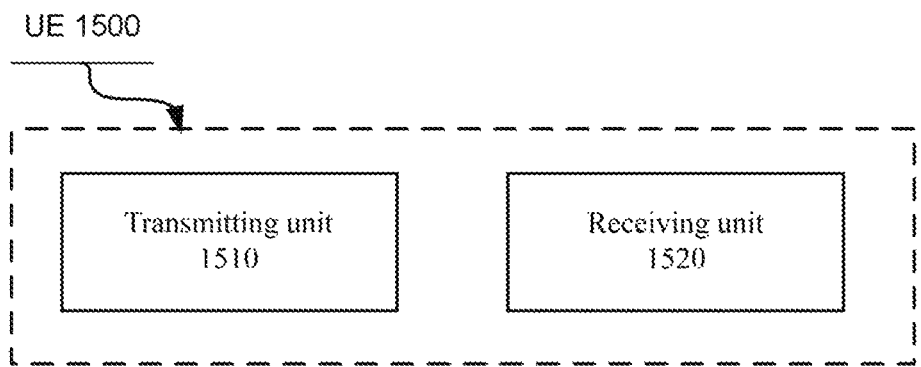
FIG. 15 is a block diagram of a UE according to the present invention.

FIG. 15 is a block diagram of UE 1500 of the present invention. The UE 1500 can be used to perform the method 100 described above. The UE 1500 includes:

a transmitting unit 1510, configured to transmit UE capability information, wherein the UE capability information comprises an indication indicating a specific scheduling mechanism supported by the UE; and a receiving unit 1520, configured to receive a configuration message, wherein the configuration message comprises configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with an interval of 1 ms or of a transmission time interval (TTI).

In one embodiment, the specific scheduling mechanism comprises a transmission disable mechanism for Media Access Control (MAC).

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a pre-scheduling resource allocation and/or released response information mechanism.

In one embodiment, the pre-scheduling resource allocation and/or released response information mechanism comprises: replying response information at a next available uplink moment when the UE receives the pre-scheduling resource allocation and/or pre-scheduling resource release signaling, the response information being used to indicate that the UE has successfully received and/or applied the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the receiving unit is further configured to receive a request regarding UE capability information, wherein the UE capability information is transmitted in response to the request.

In one embodiment, the UE capability information is included in a radio resource control (RRC) message.

In one embodiment, the RRC message is a UE capability information message.

All embodiments described above with respect to the method 100 are applicable to the UE 1500.

Figure 16:
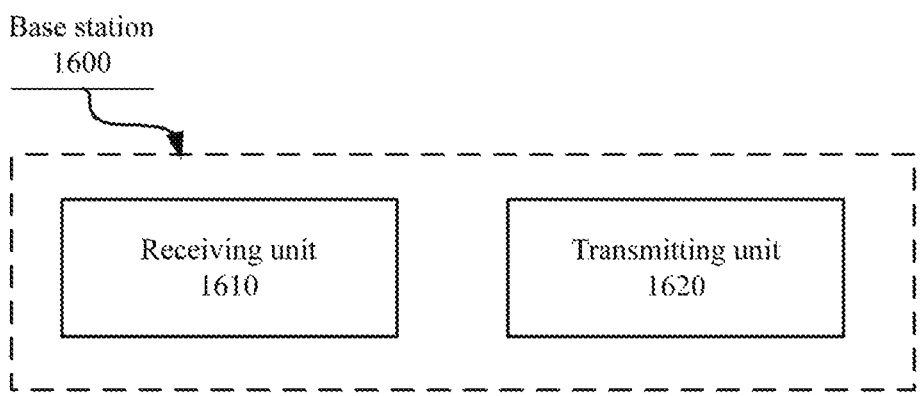
FIG. 16 is a block diagram of a base station according to the present invention.

FIG. 16 is a block diagram of a base station 1600 according to the present invention. The base station 1600 may be used to perform the method 200 described above. The base station 1600 includes:

a receiving unit 1610, configured to receive UE capability information, wherein the UE capability information comprises an indication indicating a specific scheduling mechanism supported by the UE; and a transmitting unit 1620, configured to transmit a configuration message, wherein the configuration message comprises configuration information associated with the specific scheduling mechanism.

In one embodiment, the specific scheduling mechanism comprises a fast pre-scheduling mechanism.

In one embodiment, the fast pre-scheduling mechanism comprises a semi-persistent scheduling (SPS) mechanism with a interval of 1 ms or of a transmission time interval (TTI).

In one embodiment, the specific scheduling mechanism comprises a transmission disable mechanism for MAC.

In one embodiment, the transmission disable mechanism for MAC comprises at least one of the following: disabling SPS uplink transmission that comprises zero MAC service data units (SDU); disabling SPS uplink transmission that comprises only padding bits; disabling empty transmission; and dropping grant.

In one embodiment, the specific scheduling mechanism comprises a response information mechanism for pre-scheduling resource allocation and/or release.

In one embodiment, the response information mechanism for pre-scheduling resource allocation and/or release comprises: replying response information at a next available uplink moment when the UE receives the pre-scheduling resource allocation and/or pre-scheduling resource release signaling, the response information being used to indicate that the UE has successfully received and/or applied the pre-scheduling resource allocation and/or pre-scheduling resource release signaling.

In one embodiment, the specific scheduling mechanism comprises an enhanced pre-scheduling mechanism.

In one embodiment, the enhanced pre-scheduling mechanism comprises at least one of the following: SPS with a interval of 1 ms or of 1 TTI; SPS with a interval of one or more of any combination of 1 ms, 2 ms, 3 ms, 4 ms, 5 ms, 6 ms, and 8 ms; and a contention-based uplink resource scheduling mechanism.

In one embodiment, the transmitting unit 1620 is further configured to transmit a request regarding the UE capability information.

In one embodiment, the UE capability information is included in a radio resource control (RRC) message.

In one embodiment, the RRC message is a UE capability information message.

All embodiments described above with respect to the method 200 are applicable to the base station 1600.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a recording medium for a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-piece integrated circuits). Circuits designed to execute the functions described in this description may include general purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge due to advances in semiconductor technology, the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another.

The invention claimed is:

1. A method, performed by a User Equipment (UE), comprising:
   receiving a UECapabilityEnquiry message which is used to request UE capability information;
   transmitting a UECapabilityInformation message, the UECapabilityInformation message including information indicating whether the UE supports a capability of skipping uplink (UL) transmission for a Semi-Persistent Scheduling (SPS) uplink grant if there is no data for transmission and information indicating that the UE supports uplink SPS with an interval of 1 ms, 2 ms, 3 ms, 4 ms, or 5 ms when the UE supports short interval SPS; and
   dropping the SPS uplink grant when the UE is configured to skip the SPS uplink grant and when there is no data for transmission, if the UE supports the capability.

2. A method, performed by a base station, comprising:
   transmitting, to a user equipment (UE), a UECapabilityEnquiry message which is used to request UE capability information;
   receiving a UECapabilityInformation message from the UE, the UECapabilityInformation message including information indicating whether the UE supports a capability of skipping uplink (UL) transmission for a Semi-Persistent Scheduling (SPS) uplink grant if there is no data for transmission and information indicating whether the UE supports short interval SPS with an uplink SPS interval of 1 ms, 2 ms, 3 ms, 4 ms, or 5 ms; and
   transmitting a configuration to configure the UE to skip the SPS uplink grant when there is no data for transmission and to configure the UE with a short SPS interval in response to the UECapabilityInformation message indicating the UE supports the capability and short interval SPS.

3. A User Equipment (UE), comprising:
   receiving circuitry configured to receive a UECapabilityEnquiry message which is used to request UE capability information;
   transmitting circuitry configured to transmit a UECapabilityInformation message, the UECapabilityInformation message including information indicating whether the UE supports a capability of skipping uplink (UL) transmission for a Semi-Persistent Scheduling (SPS) uplink grant if there is no data for transmission and information indicating that the UE supports uplink SPS with an interval of 1 ms, 2 ms, 3 ms, 4 ms, or 5 ms when the UE supports short interval SPS; and
   processing circuitry configured to drop the SPS uplink grant when the UE is configured to skip the SPS uplink grant and when there is no data for transmission, if the UE supports the capability.

4. A base station, comprising:
   transmitting circuitry configured to transmit, to a user equipment (UE), a UECapabilityEnquiry message which is used to request UE capability information;

receiving circuitry configured to receive a UECapabilityInformation message from the UE, the UECapabilityInformation message including information indicating that the UE supports a function of skipping uplink (UL) transmission for a Semi-Persistent Scheduling (SPS) uplink grant if there is no data for transmission, and information indicating whether the UE supports short interval SPS with an uplink SPS interval of 1 ms, 2 ms, 3 ms, 4 ms, or 5 ms; and the transmitting circuitry further configured to transmit a configuration to configure the UE to skip the SPS uplink grant when there is no data for transmission and to configure the UE with a short SPS interval in response to the UECapabilityInformation message indicating the UE supports the capability and short interval SPS.

* * * * *